US009047147B2

(12) United States Patent
Francis

(10) Patent No.: US 9,047,147 B2
(45) Date of Patent: Jun. 2, 2015

(54) METHOD AND SYSTEM FOR RECORDING AND REPLAYING USER SESSIONS IN BROWSER BASED APPLICATIONS

(71) Applicant: Yahoo! Inc., Sunnyvale, CA (US)

(72) Inventor: Steve Francis, La Jolla, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/920,174

(22) Filed: Jun. 18, 2013

(65) Prior Publication Data

US 2014/0373030 A1 Dec. 18, 2014

(51) Int. Cl.
*G06F 13/00* (2006.01)
*G06F 9/54* (2006.01)

(52) U.S. Cl.
CPC ...................................... *G06F 9/542* (2013.01)

(58) Field of Classification Search
CPC ................................ G06F 9/542; G06F 9/547
USPC .................................................. 719/311, 318
See application file for complete search history.

(56) References Cited

U.S. PATENT DOCUMENTS

| | | | | |
|---|---|---|---|---|
| 8,196,118 B2* | 6/2012 | Vainer et al. | | 717/130 |
| 8,433,733 B2* | 4/2013 | Sayed et al. | | 707/821 |
| 2009/0292825 A1* | 11/2009 | Rosu et al. | | 709/250 |
| 2011/0173239 A1* | 7/2011 | Sayed et al. | | 707/821 |
| 2011/0191676 A1* | 8/2011 | Guttman et al. | | 715/716 |

* cited by examiner

*Primary Examiner* — Andy Ho
(74) *Attorney, Agent, or Firm* — James J. DeCarlo; Greenberg Traurig, LLP

(57) ABSTRACT

A computer-implemented method for recording and replaying user sessions in browser based applications includes initiating a user session as a result of a user accessing an application in a web browser. The computer-implemented method also includes attaching an event handler to the application as a replacement for an original event handler. Further, the computer-implemented method includes executing the event handler in response to an event, wherein the event is a plurality of user actions performed during the user session. Furthermore, the computer-implemented method includes receiving the plurality of user actions as inputs to the application. Moreover, the computer-implemented method includes recording the plurality of user actions and replaying the plurality of user actions recorded at a later time.

17 Claims, 3 Drawing Sheets

METHOD AND SYSTEM FOR RECORDING AND REPLAYING USER SESSIONS IN BROWSER BASED APPLICATIONS

TECHNICAL FIELD

Embodiments of the disclosure relate generally, to browser based applications and more specifically, to record and replay user sessions in browser based applications.

BACKGROUND

At present, capturing browsing activities of a person visiting a web page is difficult. The exact sequence of the browsing activities is intricate to reproduce.

An existing method involves in analyzing page requests received by a web server. However, the method fails to provide the actual sequence of web pages visited. Moreover, the web server does not record the timings of user interactions with the web pages.

Further, the browsing activity entitles the person to interface with web applications. The web applications provide persons with sophisticated user interfaces and access to information across the Internet.

However, these web applications can be problematic when it comes to troubleshooting and debugging. Bugs that are discovered in the course of running the web applications cannot be replicated to resolve such bugs. One technique to overcome this difficulty involves in inserting log files into the source code of the web application. Consequently, the log files are recorded to assist in troubleshooting. However, the resulting log files do not provide sufficient data for troubleshooting.

In light of the foregoing discussion, there is a need for an efficient method and system for recording and replaying user sessions in browser based applications.

SUMMARY

The above-mentioned needs are met by a computer-implemented method, computer program product, and system for recording and replaying user sessions in browser based applications.

An example of a computer-implemented method for recording and replaying user sessions in browser based applications includes initiating a user session as a result of a user accessing an application in a web browser. The computer-implemented method also includes attaching an event handler to the application as a replacement for an original event handler. Further, the computer-implemented method includes executing the event handler in response to an event, wherein the event is a plurality of user actions performed during the user session. Furthermore, the computer-implemented method includes receiving the plurality of user actions as inputs to the application. Moreover, the computer-implemented method includes recording the plurality of user actions and replaying the plurality of user actions recorded at a later time.

An example of a computer program product stored on a non-transitory computer-readable medium that when executed by a processor, performs a method for recording and replaying user sessions in browser based applications includes initiating a user session as a result of a user accessing an application in a web browser. The computer program product includes attaching an event handler to the application as a replacement for an original event handler. The computer program product also includes executing the event handler in response to an event, wherein the event is a plurality of user actions performed during the user session. Further, the computer program product includes receiving the plurality of user actions as inputs to the application. Moreover, the computer program product includes recording the plurality of user actions and replaying the plurality of user actions recorded at a later time.

An example of a system for recording and replaying user sessions in browser based applications includes a computing device. The system also includes a web interface that receives a plurality of user actions as inputs to the applications. Further, the system includes a processor operable to initiate a user session as a result of a user accessing an application in a web browser, attach an event handler to the application as a replacement for an original event handler, execute the event handler in response to an event, and record the plurality of user actions. Furthermore, the system includes a playback device that replays the recorded user session at a later time.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, computer program product, and system for recording and replaying user sessions in browser based applications are disclosed. The following detailed description is intended to provide example implementations to one of ordinary skill in the art, and is not intended to limit the invention to the explicit disclosure, as one of ordinary skill in the art will understand that variations can be substituted that are within the scope of the invention as described.

Figure 1:
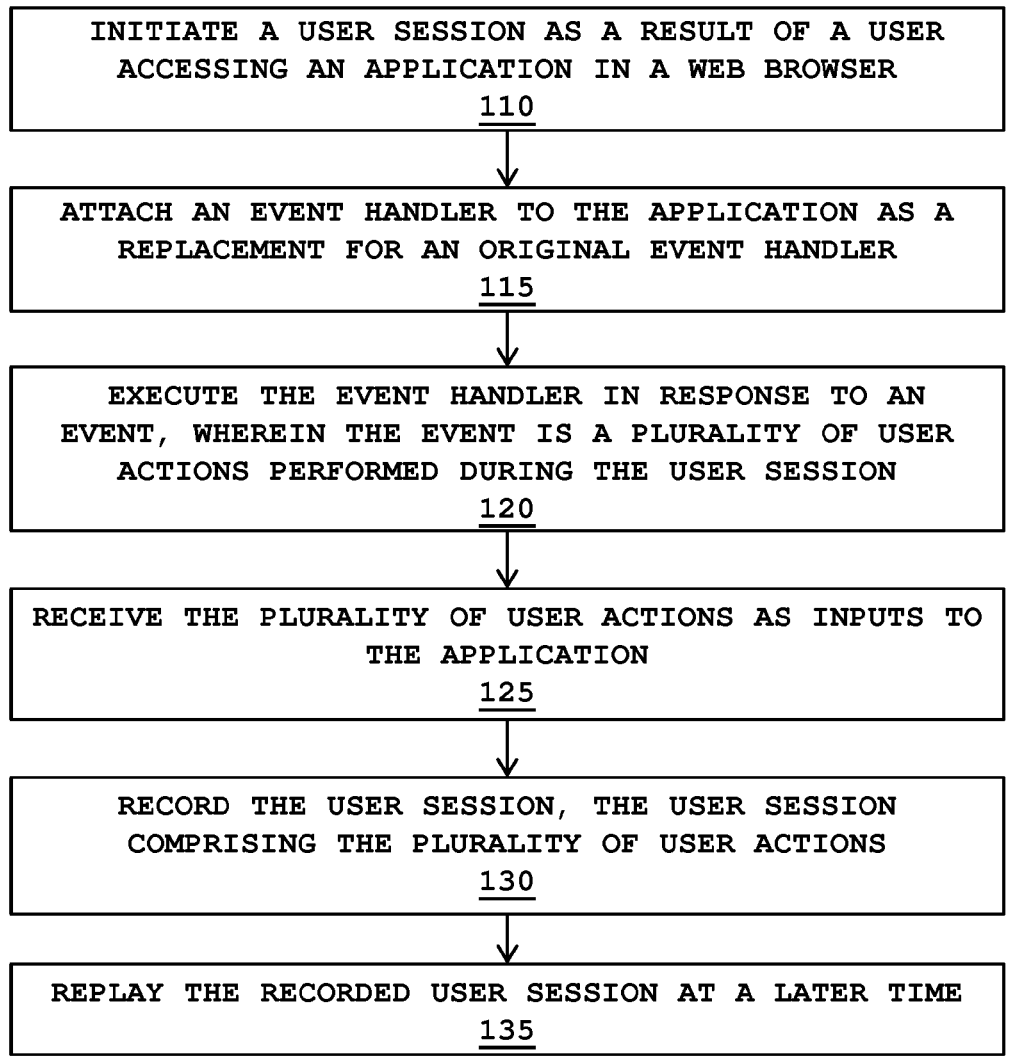
FIG. 1 is a flow diagram illustrating a method for recording and replaying user sessions in browser based applications, in accordance with one embodiment.

FIG. 1 is a flow diagram illustrating a method for recording and replaying user sessions in browser based applications, in accordance with one embodiment.

At step 110, a user session is initiated as a result of a user accessing an application in a web browser.

The user often downloads a website in a web browser to access desired applications on a mobile device. The applications are browser based applications that run within the web browser. Instructions relevant to the applications are typically written in a combination of Hyper Text Markup Language (HTML) and JavaScript. The instructions are then embedded within a web page that is downloaded from a web site. Examples of the applications include, but are not limited to, GoogleDocs, WebEx, GoToMeeting. Examples of the web browsers include, but are not limited to, Google Chrome, Internet Explorer, Firefox and Safari. Examples of the mobile devices include, but are not limited to, iphone—Siri, android and win. In some embodiments, the mobile devices can include, for example desktop computers, laptops, PDAs and cell phones.

Further, the browser based applications display their User Interface (UI) through the web browser's Document Object Model (DOM). The DOM is an Application Programming Interface (API) for HTML and Extensible Markup Language (XML) documents.

Once the user accesses an application, a user session is initiated. The user session describes a specified period of time that a user spends on the web site. The user performs a plurality of actions. The actions are herein referred to as user actions. Examples of the user actions include, but are not limited to, moving of mouse over link, clicking of link, submission of a form, pressing a button, keystrokes, mouse movements and system occurrences such as out of memory.

At step 115, an event handler is attached to the application as a replacement for an original event handler.

An event handler is a software routine attached at the end of the application. The software routine is typically a function or a method containing program statements that are executed in response to an event. The event is a user action or an occurrence detected by a program. Examples of the event includes, but is not limited to, clicking a mouse button, pressing a key and system occurrences such as running out of memory.

The event handler that is usually attached to the application is herein referred to as the original event handler.

The application typically calls a function call to attach the original event handler. At this point, the function call is intercepted and a different event handler is attached to the application. Consequently, the original event handler is then saved into memory. In some embodiments, the event handler can be saved into an event log. By means of attaching the event handler, the application begins to receive inputs from the user.

Further, the event handler can be added to individual HTML elements, to the overall document or to the window displaying the document.

At step 120, the event handler is executed in response to an event. The event includes the user actions performed during the user session.

The event handler detects a specific event and the software routine that is attached to the application is executed.

For example, when a user presses a key on a keyboard, a program currently running would receive a keyboard "Key Down" event along with relevant data such as which key the user had pressed. Similarly, clicking a button on a mouse triggers a 'mouse click' event.

At step 125, the plurality of user actions are received as inputs to the application.

The inputs are further passed to the original event handler.

At step 130, the plurality of user actions are recorded.

Exact sequence of the user actions along with corresponding timestamp of the user actions is recorded. All relevant information of the user actions are saved in memory. In some embodiments, event messages are utilized to start and stop recording.

The recorded user actions are then passed to the original event handler.

In some embodiments, network transactions are also recorded. All XHR requests and responses are recorded.

At this point, the user session is ended in response to the user quitting the application in the web browser.

At step 135, the recorded user actions are replayed at a later time.

Synthetic browser events are generated for the recorded user actions. The synthetic browser events are created by the application. For example, the application can create a mouse event to stimulate a click when the user has not clicked the mouse. Soon after generating, the synthetic browser events are dispatched at a later time.

The recorded user actions are replayed in the future in order to reproduce a possible bug.

Further, the recorded network transactions are replayed at a later time. As a result of replaying the exact sequence and timings of user actions along with the XHR requests and responses, the entire user session is replayed exactly. This provides the best chance to reproduce a bug.

Figure 2:
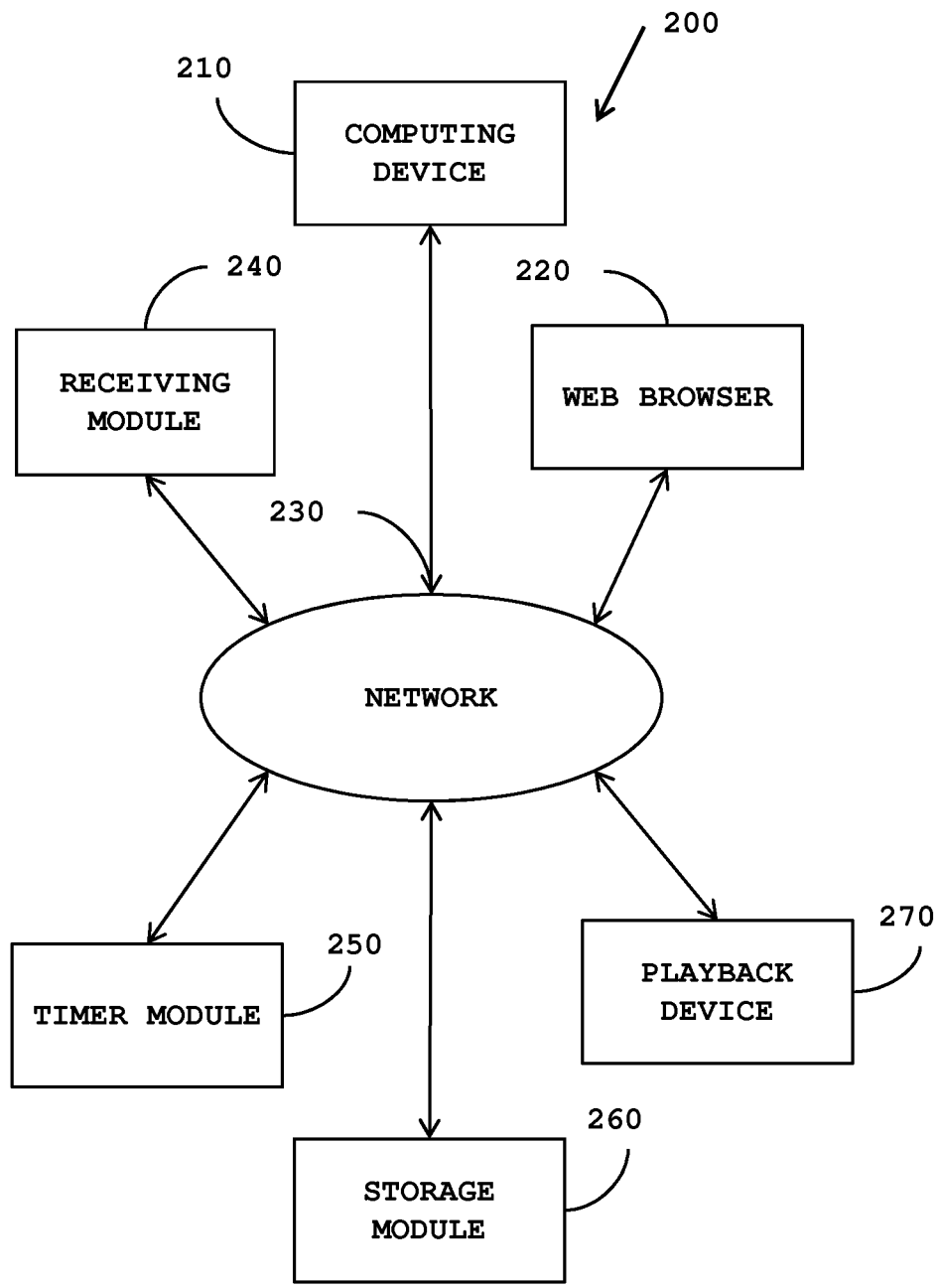
FIG. 2 is a block diagram illustrating a system for recording and replaying user sessions in browser based applications, in accordance with one embodiment.

FIG. 2 is a block diagram illustrating a system for recording and replaying user sessions in browser based applications, in accordance with one embodiment.

The system 200 can implement the method described above. The system 200 includes a computing device 210, a web browser 220, a receiving unit 240, a timer module 250, a storage module 260 and a playback device 270 in communication with a network 230 (for example, the Internet or a cellular network).

The computing device 210 includes a web browser 220 to enable users to access, retrieve and view documents and other resources, such as applications, on the Internet.

Examples of the computing device 210 include, but are not limited to, a Personal Computer (PC), a stationary computing device, a laptop or notebook computer, a tablet computer, a smart phone or a Personal Digital Assistant (PDA), a smart appliance, a video gaming console, an internet television, or other suitable processor-based devices.

The web browser 220 loads appropriate applications to the user.

The receiving module 240 receives inputs to an application from a user of the computing device 210. In some embodiments, the receiving module 240 can be a component of the computing device 210.

The timer module 250 records timestamp of all user actions performed during the user session.

The storage module 260 stores event handlers that are attached to the end of the applications. The event handlers are a function or a method that are executed in response to an event. The event is an action or occurrence performed by a user of the computing device 210 and is detected by the event handler.

The playback device 270 can be any suitable computer such as a personal computer (PC) or a laptop computer, having a display, such as video monitor or flat panel display. The playback device 270 replays the recorded user session at a later time.

The user of the computing device 210 desires to access an application through the web browser 220. As the application is loaded, a user session is initiated. The user performs a plurality of actions to interface with the application. Consequently, these actions are received as inputs to the applications by the receiving module 240. As the user session is in progress, all the inputs are recorded and stored in the storage module 260. The exact sequence of the inputs is recorded. Further, the timestamp associated with each of the inputs is captured by the timer module 250. The entire user session which has been recorded can now be replayed at a later time. Consequently, bugs can be solved trouble-free.

Figure 3:
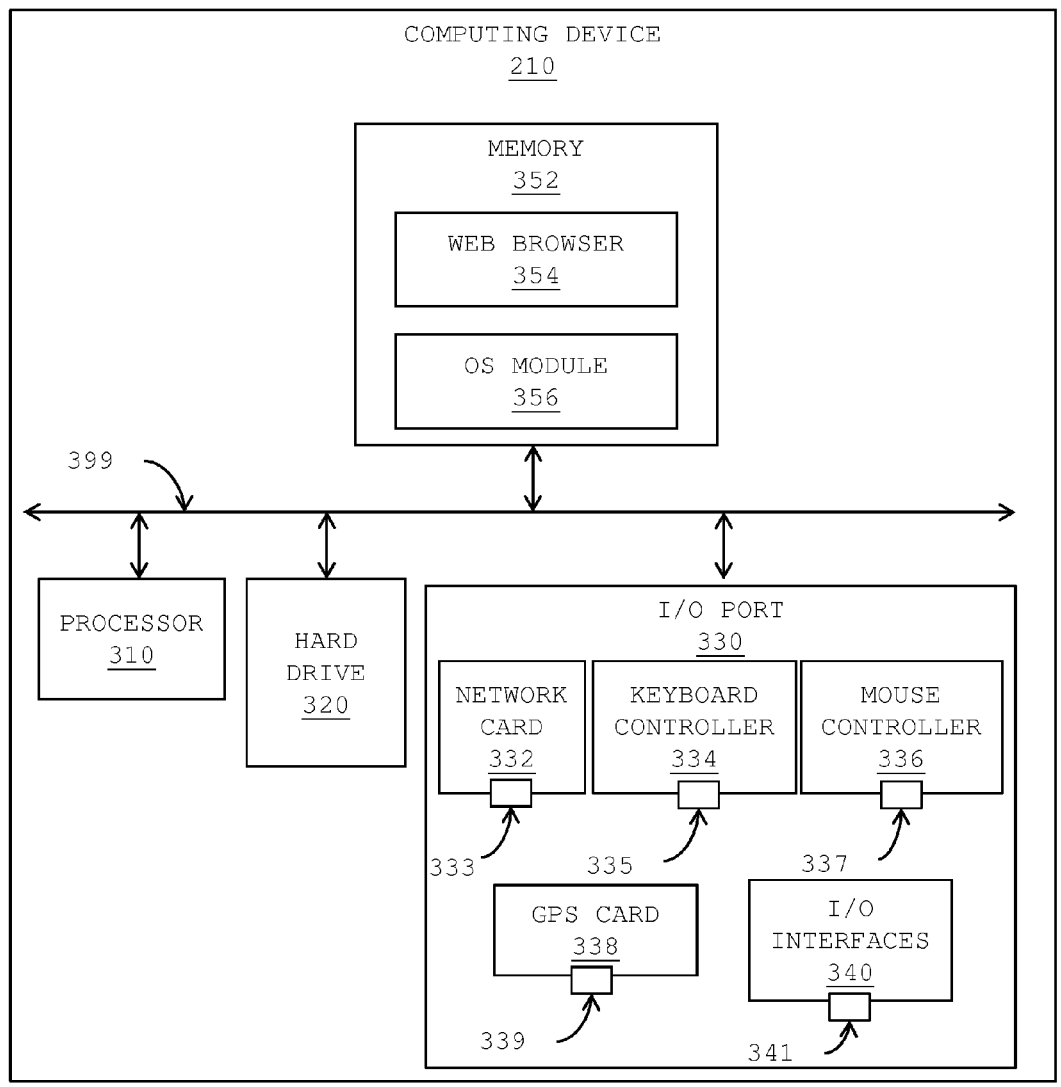
FIG. 3 is a block diagram illustrating an exemplary computing device, in accordance with one embodiment.

Additional embodiments of the computing device 210 are described in detail in conjunction with FIG. 3.

FIG. 3 is a block diagram illustrating an exemplary computing device, for example the computing device 210 in accordance with one embodiment. The computing device 210 includes a processor 310, a hard drive 320, an I/O port 330, and a memory 352, coupled by a bus 399.

The bus 399 can be soldered to one or more motherboards. Examples of the processor 310 includes, but is not limited to, a general purpose processor, an application-specific integrated circuit (ASIC), an FPGA (Field Programmable Gate Array), a RISC (Reduced Instruction Set Controller) processor, or an integrated circuit. The processor 310 can be a single core or a multiple core processor. In one embodiment, the processor 310 is specially suited for processing demands of location-aware reminders (for example, custom micro-code, and instruction fetching, pipelining or cache sizes). The processor 310 can be disposed on silicon or any other suitable material. In operation, the processor 310 can receive and execute instructions and data stored in the memory 352 or the hard drive 320. The hard drive 320 can be a platter-based storage device, a flash drive, an external drive, a persistent memory device, or other types of memory.

The hard drive 320 provides persistent (long term) storage for instructions and data. The I/O port 330 is an input/output panel including a network card 332 with an interface 333 along with a keyboard controller 334, a mouse controller 336, a GPS card 338 and I/O interfaces 340. The network card 332 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 333 is configured according to networking compatibility. For example, a wired networking card includes a physical port to plug in a cord, and a wireless networking card includes an antennae. The network card 332 provides access to a communication channel on a network. The keyboard controller 334 can be coupled to a physical port 335 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 336 can also be coupled to a physical port 337 (for example, mouse or USB port). The GPS card 338 provides communication to GPS satellites operating in space to receive location data. An antenna 339 provides radio communications (or alternatively, a data port can receive location information from a peripheral device). The I/O interfaces 340 are web interfaces and are coupled to a physical port 341.

The memory 352 can be a RAM (Random Access Memory), a flash memory, a non-persistent memory device, or other devices capable of storing program instructions being executed. The memory 352 comprises an Operating System (OS) module 356 along with a web browser 354. In other embodiments, the memory 352 comprises a calendar application that manages a plurality of appointments. The OS module 356 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 354 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 354 is used to download the web pages or other content in various formats including HTML, XML, text, PDF, postscript, python and PHP and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

Advantageously, the method requires no prior instrumentation and can be applied to a large programming code. Further, the method can be applied to runtime environments. Moreover, the recorded user sessions can be e-mailed or even placed in bug descriptions. The method also eliminates the need to depend on faulty user memories while trying to reproduce bugs.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   initiating, via a computing device, a user session as a result of a user accessing an application in a web browser;
   attaching, via the computing device, an event handler to the application as a replacement for an original event handler of the application;
   executing, via the computing device, the event handler in response to an event, the event comprising a plurality of user actions performed during the user session;
   receiving, at the computing device, the plurality of user actions as inputs to the application;
   recording, via the computing device, the user session, the user session comprising the plurality of user actions; and
   replaying, via the computing device, the recorded user session at a later time.

2. The method of claim 1, further comprising:
   passing the inputs to the original event handler.

3. The method of claim 1, wherein attaching the event handler further comprises:
   saving the original event handler.

4. The method of claim 1, wherein recording the user session includes saving relevant information of the user actions along with a timestamp of the user actions.

5. The method of claim 1, wherein the replaying further comprises:
   generating synthetic browser events for the user actions recorded; and
   dispatching the synthetic browser events at a later time.

6. The method of claim 1, further comprising:
   suppressing one or more network transactions;
   recording the one or more network transactions; and
   replaying the recorded network transactions at a later time.

7. The method of claim 1, further comprising:
   ending the user session in response to the user quitting the application in the web browser.

8. A non-transitory computer-readable storage medium tangibly encoded with computer-executable instructions, that when executed by a processor associated with a computing device, performs a method comprising:
   initiating a user session as a result of a user accessing an application in a web browser;
   attaching an event handler to the application as a replacement for an original event handler of the application;
   executing the event handler in response to an event, the event comprising a plurality of user actions performed during the user session;
   receiving the plurality of user actions as inputs to the application;
   recording the user session, the user session comprising the plurality of user actions; and
   replaying the recorded user session at a later time.

9. The non-transitory computer-readable storage medium of claim 8, further comprising:
   passing the inputs to the original event handler.

10. The non-transitory computer-readable storage medium of claim 8, wherein attaching the event handler further comprises:
    saving the original event handler.

11. The non-transitory computer-readable storage medium of claim 8, wherein recording the user session includes saving relevant information of the user actions along with a timestamp of the user actions.

12. The non-transitory computer-readable storage medium of claim 8, wherein the replaying further comprises:
    generating synthetic browser events for the user actions recorded; and
    dispatching the synthetic browser events at a later time.

13. The non-transitory computer-readable storage medium of claim 8, further comprising:
    suppressing one or more network transactions;
    recording the one or more network transactions; and
    replaying the recorded network transactions at a later time.

14. The non-transitory computer-readable storage medium of claim 8, further comprising:
    ending the user session in response to the user quitting the application in the web browser.

15. A system comprising:
    a processor;
    a non-transitory computer-readable storage medium for tangibly storing thereon program logic for execution by the processor, the program logic comprising:
       initiation logic executed by the processor for initiating a user session as a result of a user accessing an application in a web browser;
       attachment logic executed by the processor for attaching an event handler to the application as a replacement for an original event handler of the application;
       execution logic executed by the processor for executing the event handler in response to an event, the event comprising a plurality of user actions performed during the user session;
       receiving logic executed by the processor for receiving the plurality of user actions as inputs to the application;
       recording logic executed by the processor for recording the user session, the user session comprising the plurality of user actions; and
       replay logic executed by the processor for replaying the recorded user session at a later time.

16. The system of claim 15, further comprising:
    communication logic executed by the processor for communicating a plurality of web pages to a user.

17. The system of claim 15, further comprising:
    recording logic executed by the processor for recording a timestamp of the user actions; and receiving logic executed by the processor for receiving one or more network transactions.

* * * * *